US008982688B2

(12) United States Patent
Froese et al.

(10) Patent No.: US 8,982,688 B2
(45) Date of Patent: Mar. 17, 2015

(54) CONGESTION ABATEMENT IN A NETWORK INTERCONNECT

(75) Inventors: Edwin L. Froese, Burnaby (CA); Christopher B. Johns, Edina, MN (US); Aaron F. Godfrey, Eagan, MN (US); Laurence S. Kaplan, Shoreline, WA (US); Matthew P. Kelly, Eau Claire, WI (US); Brent T. Shields, Minneapolis, MN (US)

(73) Assignee: Cray Inc, Seattle, WA (US)

( * ) Notice: Subject to any disclaimer, the term of this patent is extended or adjusted under 35 U.S.C. 154(b) by 705 days.

(21) Appl. No.: 13/044,139

(22) Filed: Mar. 9, 2011

(65) Prior Publication Data

US 2012/0230177 A1 Sep. 13, 2012

(51) Int. Cl.
*H04J 7/00* (2006.01)
*H04J 1/16* (2006.01)
*H04J 3/14* (2006.01)
*H04J 1/00* (2006.01)
*H04L 12/933* (2013.01)
*H04L 12/801* (2013.01)
*H04L 12/825* (2013.01)
*H04L 12/773* (2013.01)
*H04L 12/26* (2006.01)

(52) U.S. Cl.
CPC ............... *H04L 49/10* (2013.01); *H04L 47/11* (2013.01); *H04L 47/263* (2013.01); *H04L 45/60* (2013.01); *H04L 43/0852* (2013.01)
USPC ........... 370/212; 370/229; 370/230; 370/242; 370/252

(58) Field of Classification Search
USPC ......................... 370/212, 229, 242
See application file for complete search history.

(56) References Cited

U.S. PATENT DOCUMENTS

| | | | |
|---|---|---|---|
| 5,918,182 A * | 6/1999 | Korus et al. ................... | 455/517 |
| 6,888,824 B1 | 5/2005 | Fang et al. | |
| 7,324,441 B1 | 1/2008 | Kloth et al. | |
| 7,487,531 B1 | 2/2009 | Vogel et al. | |
| 7,657,537 B1 * | 2/2010 | Corbett ......................... | 718/101 |
| 7,688,788 B2 | 3/2010 | Gefflaut et al. | |
| 7,706,255 B1 * | 4/2010 | Kondrat et al. ............... | 370/219 |
| 2002/0057650 A1 * | 5/2002 | Chuah et al. .................. | 370/232 |

(Continued)

OTHER PUBLICATIONS

Abts, D., et al., "Age-Based Packet Arbitration in Large-Radix $k$-ary $n$-cubes," 2007 ACM/IEEE SC07 Conference, Nov. 2007, 11 pages.
Alverson, R., et al., "The Gemini System Interconnect," 18th IEEE Symposium on High Performance Interconnects, Aug. 2010, 5 pages.
Fabrizio, P., et al., "Performance Evaluation of the Quadrics Interconnection Network," 15th International Parallel and Distributed Processing Symposium Workshops, Apr. 2001, 23 pages.

(Continued)

*Primary Examiner* — Derrick Ferris
*Assistant Examiner* — Kodzovi Acolatse
(74) *Attorney, Agent, or Firm* — Perkins Coie LLP

(57) ABSTRACT

A method and system for detecting congestion in a network of nodes, abating the network congestion, and identifying the cause of the network congestion is provided. A congestion detection system may comprise a detection system, an abatement system, and a causation system. The detection system monitors the performance of network components such as the network interface controllers and tiles of routers to determine whether the network is congested such that a delay in delivering packets becomes unacceptable. Upon detecting that the network is congested, an abatement system abates the congestion by limiting the rate at which packets are injected into the network from the nodes. Upon detecting that the network is congested, a causation system may identify the job that is executing on a node that is the cause of the network congestion.

16 Claims, 18 Drawing Sheets

(56) References Cited

U.S. PATENT DOCUMENTS

| | | | |
|---|---|---|---|
| 2002/0163976 A1* | 11/2002 | Karthaus | 375/295 |
| 2003/0195983 A1 | 10/2003 | Krause | |
| 2005/0185578 A1 | 8/2005 | Padmanabhan et al. | |
| 2005/0286416 A1 | 12/2005 | Shimonishi et al. | |
| 2008/0134213 A1 | 6/2008 | Alverson et al. | |
| 2008/0225737 A1* | 9/2008 | Gong et al. | 370/252 |
| 2008/0304831 A1* | 12/2008 | Miller et al. | 398/115 |
| 2009/0170547 A1* | 7/2009 | Raghothaman et al. | 455/522 |
| 2010/0011115 A1* | 1/2010 | Kliland et al. | 709/230 |
| 2012/0230188 A1 | 9/2012 | Godfrey et al. | |
| 2012/0230212 A1 | 9/2012 | Kaplan et al. | |

OTHER PUBLICATIONS

InfiniBand Trade Association, "InfiniBand Architecture Specification vol. 1, Release 1.2.1," Nov. 2007, 1727 pages.

Thaler, Pat, "IEEE 802 Tutorial: Congestion Notification," IEEE 802 Plenary, San Diego, CA, Jul. 17, 2006, 45 pages.

Non-Final Office Action for U.S. Appl. No. 13/044,099, Mail Date Oct. 17, 2013, 20 pages.

Non-Final Office Action for U.S. Appl. No. 13/044,177, Mail Date Oct. 10, 2013, 9 pages.

* cited by examiner

CONGESTION ABATEMENT IN A NETWORK INTERCONNECT

CROSS-REFERENCE TO RELATED APPLICATION(S)

This application is related to U.S. patent application Ser. No. 13/444,099, filed concurrently herewith, entitled "CONGESTION DETECTION IN A NETWORK INTERCONNECT" and U.S. patent application Ser. No. 13/044,177, filed concurrently herewith, entitled "CONGESTION CAUSATION IN A NETWORK INTERCONNECT", each of which is incorporated by reference herein in its entirety.

BACKGROUND

Massively parallel processing ("MPP") systems may have tens of thousands of nodes connected via a communications mechanism. Each node may include one or more processors (e.g., an AMD Opteron processor), memory (e.g., between 1-8 gigabytes), and a communications interface (e.g., HyperTransport technology) connected via a network interface controller ("NIC") to a router with router ports. Each router may be connected via its router ports to some number of other routers and then to other nodes to form a routing topology (e.g., torus, hypercube, and fat tree) that is the primary system network interconnect. Each router may include routing tables specifying how to route incoming packets from a source node to a destination node. The nodes may be organized into modules (e.g., a board) with a certain number (e.g., 4) of nodes and routers each, and the modules may be organized into cabinets with multiple (e.g., 24) modules in each cabinet. Such systems may be considered scalable when an increase in the number of nodes results in a proportional increase in their computational capacity. An example network interconnect for an MPP system is described in Alverson, R., Roweth, D., and Kaplan, L., "The Gemini System Interconnect," 2010 IEEE Annual Symposium on High Performance Interconnects, pp. 83-87, Mountain View, Calif., Aug. 18-20, 2010, which is hereby incorporated by reference.

The nodes of an MPP system may be designated as service nodes or compute nodes. Compute nodes are primarily used to perform computations. A service node may be dedicated to providing operating system and programming environment services (e.g., file system services, external I/O, compilation, editing, etc.) to application programs executing on the compute nodes and to users logged in to the service nodes. The operating system services may include I/O services (e.g., access to mass storage), processor allocation services, log in capabilities, and so on. The service nodes and compute nodes may employ different operating systems that are customized to support the processing performed by the node.

An MPP system may include a supervisory system comprising a hierarchy of controllers for monitoring components of the MPP system as described in U.S. Patent Application No. 2008/0134213, entitled "Event Notifications Relating to System Failures in Scalable Systems," filed on Sep. 18, 2007, which is hereby incorporated by reference. At the lowest level of the hierarchy, the supervisory system may include a controller associated with each node that is implemented as software that may execute on the node or on special-purpose controller hardware. At the next lowest level of the hierarchy, the supervisory system may include a controller for each module that may be implemented as software that executes on special-purpose controller hardware. At the next lowest level of the hierarchy, the supervisory system may include a controller for each cabinet that also may be implemented in software that executes on special-purpose controller hardware. The supervisory system may then include other levels of controllers for groups of cabinets referred to as slices, groups of slices referred to as sections, and so on. At the top of the hierarchy is a controller designated as the supervisory controller or system management workstation, which provides a view of the overall status of the components of the multiprocessor system. The hierarchy of controllers forms a tree organization with the supervisory controller being the root and the controllers of the nodes being the leaf controllers. Each controller communicates between its parent and child controller using a supervisory communication network that is independent of (or out of band from) the primary system network interconnect. For example, the supervisory communication network may be a high-speed Ethernet network.

The controllers monitor the status of the nodes, network interface controllers, and routers. A leaf controller (or node controller) may monitor the status of the hardware components of the node and the system services executing on the node. The next higher level controller (module controller or L0 controller) may monitor the status of the leaf controllers of the nodes of the module, power to the module, and so on. The next higher level controller (cabinet controller or L1 controller) may monitor the status of the next lower level controllers, power to the cabinet, cooling of the cabinet, and so on.

FIG. 1 is a block diagram that illustrates an example controller hierarchy of a supervisory system. The controller hierarchy 100 includes a root or supervisory controller 101. The supervisory controller is the parent controller for the section controllers 102. A section is a grouping of slices. Each section controller is a parent controller of slice controllers 103. A slice is a grouping of cabinets. Each slice controller is a parent controller of cabinet controllers 104. A cabinet physically contains the modules. Each cabinet controller is a parent controller of module controllers 105 within the cabinet. A module is a physical grouping of a number (e.g., four) of nodes. Each module controller is a parent controller of node controllers 106 on a module. The lines between the controllers represent the logical communications path between the controllers, which may be implemented as a supervisory communications network that is out of band from the primary system network interconnect, which is not shown in FIG. 1.

FIG. 2 is a block diagram that illustrates an example network interface and routing device of a network interconnect. A network device 200 includes two network interface controllers ("NICs") 210 and 211. Each network interface controller is connected via a HyperTransport connection 220 or a HyperTransport connection 221 to a node (not shown). The network interface controllers are connected to a router 230 via a netlink 260. The network device also includes a supervisory component 240 with a connection to a local controller 250. The packets from the network interface controllers are routed via the netlink to the router over a router input selected for load balancing purposes. The router routes the packets to one of 40 network connections. Each packet may comprise a variable number of fixed-sized flow control units, referred to as "flits."

FIG. 3 is a block diagram that illustrates the connections of an example network device. The network device 300 includes 40 router ports 301 for connection to other routers in the network interconnect. The network device includes four links of four ports each in the x and z directions and two links of four ports each in the y direction.

FIG. 4 is a block diagram that illustrates the layout of an example router. The router 400 comprises 48 tiles arranged into a matrix of six rows and eight columns. The router provides 40 connections to the network and eight connections to the network interface controllers via the network link. Each tile 410 includes an input buffer 411, routing logic 412, a row bus 413, row buffers 414, an 8×6 switch 415, a column bus 416, output buffers 417, and output multiplexor 418. The packets are received at a tile via the router port connected to the input buffer and processed on a flit-by-flit basis by the routing logic. During each cycle of the tile, the routing logic retrieves a flit (if available) from the input buffer and routes the flit via a line of the row bus to one of the row buffers of a tile in the same row. If that row buffer is full, then the routing logic leaves the flit in the input buffer and repeats the process during the next cycle. At each cycle, flits in the row buffers are routed via the 8×6 switch to an output buffer in a tile in the same column. During each cycle, the output logic sends a flit from an output buffer to the router port associated with that tile. The tiles of the routers and the network interface controllers are referred to as "network components."

Depending on the characteristics of the jobs executing on the compute nodes, the network interconnect may not be able to transmit requests from an originating node to a destination node and receive a corresponding response in a timely manner. For example, if many nodes (e.g., 999 nodes in a 1,000 node network) executing an execution thread of the job rapidly send requests to a single destination node also executing an execution thread of the job, then the buffers of the tiles that lead to the destination node may become full. If the buffers are full, then the routing logic of the tiles will spend cycles waiting for the buffer to be no longer full. If the network interconnect cannot deliver packets in a timely manner to even a single node, the speed at which all the jobs execute on the nodes of the network can be negatively impacted.

DETAILED DESCRIPTION

Figure 1:
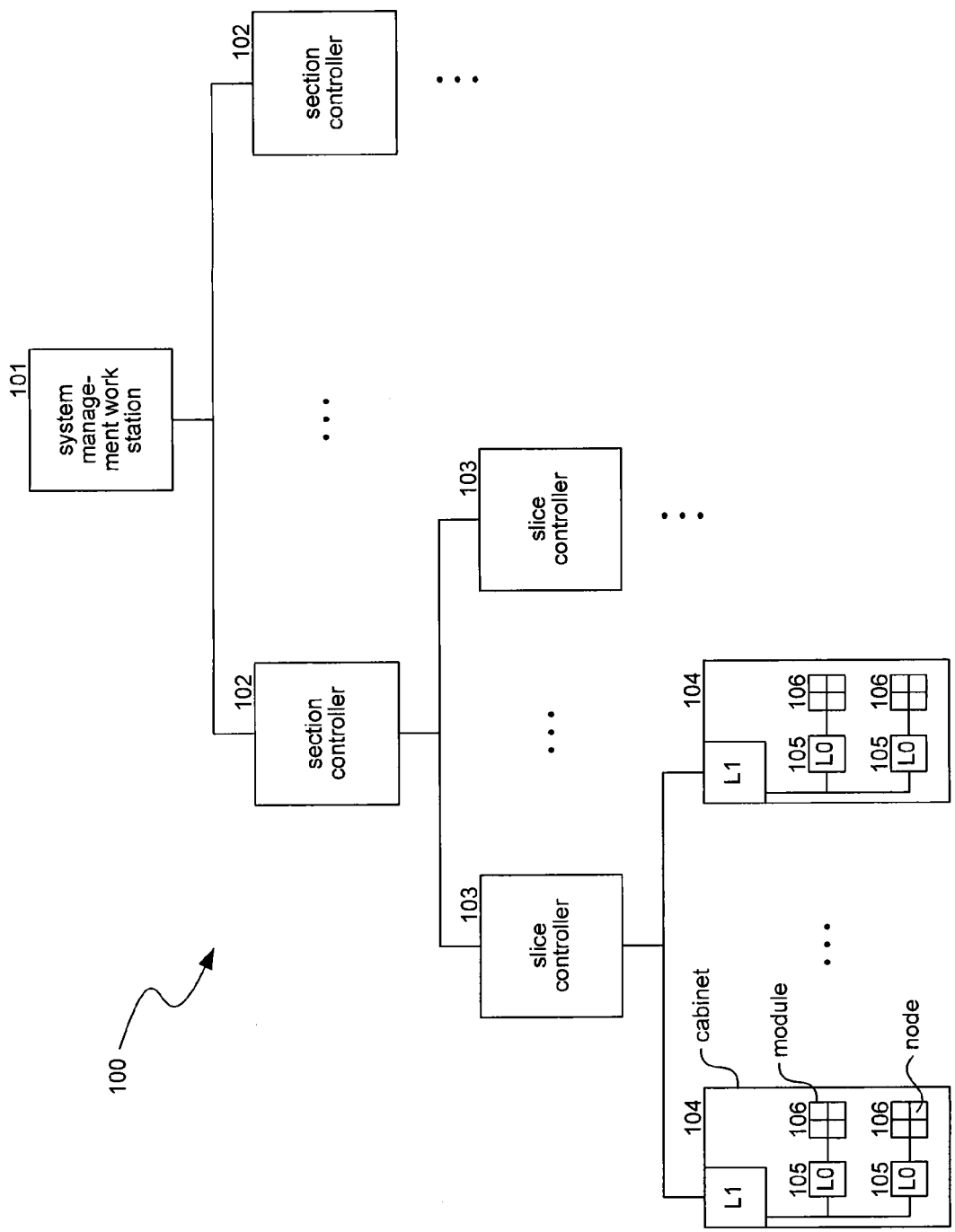
FIG. 1 is a block diagram that illustrates a controller hierarchy of the supervisory system in some embodiments.
Figure 2:
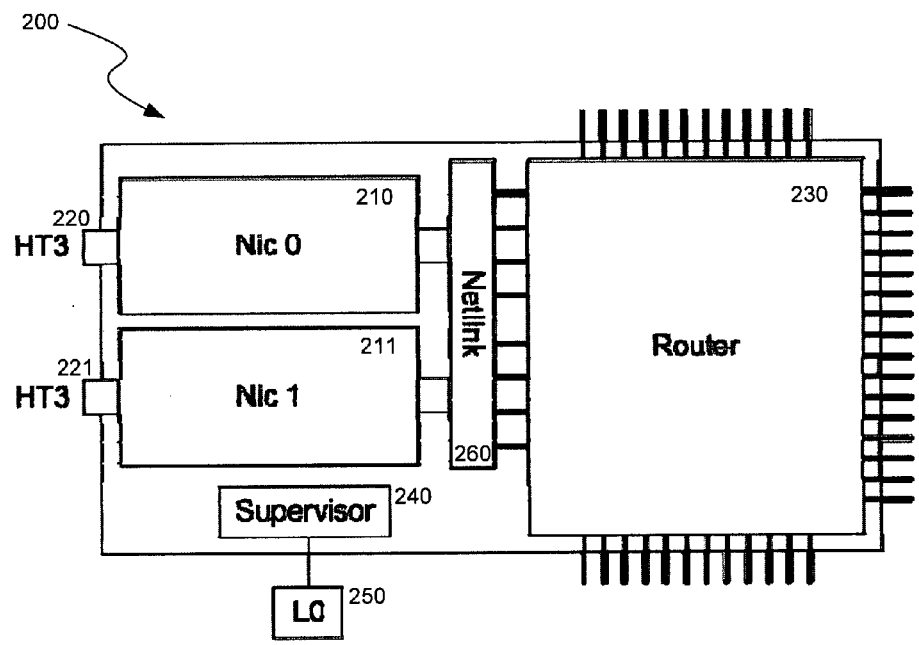
FIG. 2 is a block diagram that illustrates an example network interface and routing device of a network interconnect.
Figure 3:
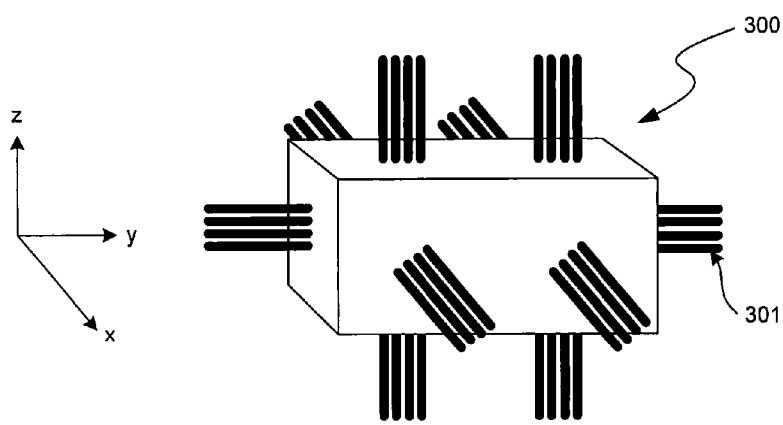
FIG. 3 is a block diagram that illustrates the connections of an example network routing device.
Figure 4:
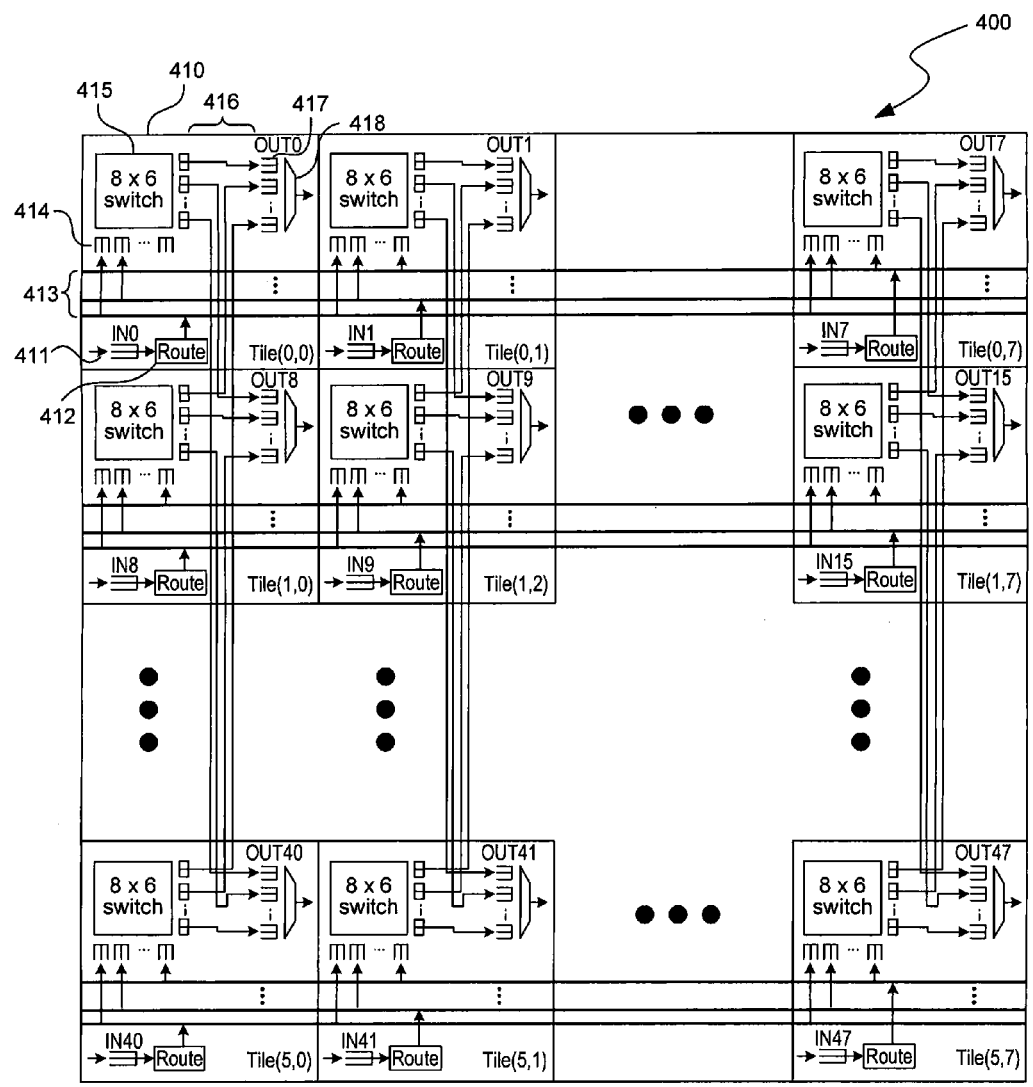
FIG. 4 is a block diagram that illustrates the layout of an example router.

A method and system for detecting congestion in a network of nodes, abating the network congestion, and identifying the cause of the network congestion is provided. A congestion detection system may comprise a detection system, an abatement system, and a causation system. The detection system monitors the performance of network components, such as the network interface controllers and tiles of routers, to determine whether the network is congested such that a delay in delivering packets becomes unacceptable. In some embodiments, the detection system collects performance measurements for each network component for every measurement period (e.g., one second). For example, the detection system may collect the number of flits routed by the routing logic of each tile during the measurement period and the number of cycles during the measurement period during which a flit was available (i.e., in the input buffer) but could not be routed because a destination buffer was full. The detection system determines from the collected performance measurements whether each network component is stalled during a measurement period using a stall criterion. For example, the stall criterion for a tile may be based on a ratio derived from the number of flits forwarded by the tile during a measurement period and the number of clock cycles (i.e., tile periods) during the measurement period in which a flit was delayed (i.e., available, but could not be routed) at the tile. The detection system may determine whether the network is congested during a measurement period using a network congestion criterion. For example, the network congestion criterion may specify a number or a percentage of tiles. If more than that number or percentage of tiles are stalled during a measurement period, then the detection system indicates that the network is congested. In some embodiments, a local controller associated with each network component implements a portion of the detection system and determines whether the network component is stalled during a measurement period. Each local controller may send via an out-of-band network connection information about stalled network components to a supervisory controller. The supervisory controller determines, based on the information received from multiple local controllers, whether the network is congested.

Upon detecting that the network is congested, an abatement system abates the congestion by limiting the rate at which packets are injected into the network from the nodes.

The abatement system limits the rate by sending to each local controller an indication that the network is congested. Each local controller then limits the rate at which packets from the nodes (e.g., compute nodes) that it controls are injected into the network. Because the rate at which packets are injected into the network is limited, the network components are able to eventually alleviate the congestion. Various techniques may be used to limit the rate at which packets are injected into the network. In some embodiments, the local controller may use a "pulse width modulation" technique to limit the injection rate by limiting the time during which a network interface controller can inject packets into the network to a fraction of each measurement period or other period. In other embodiments, the abatement system may require the packets to be spaced apart in time to ensure that the limited packet injection rate is not exceeded. The abatement system may also limit the rate of packet injection by only allowing a limited number of requests to be outstanding (i.e., for which a response has not been received) at the same time. In some embodiments, a supervisory controller, upon detecting network congestion, sends via the out-of-band network connection an abatement notification to each local controller associated with each network interface controller. The local controllers then effect the limiting of the injection rate of packets into the network by the network interface controller while the abatement is in effect.

Upon detecting that the network is congested, a causation system may identify the job that is executing on a node that is the cause of the network congestion. The causation system may monitor the ejection rate at which packets are ejected from the network to a node during abatement. The causation system may determine that the node whose ejection rate satisfies a congestion cause criterion may be executing the job that is causing the network congestion. For example, the congestion cause criterion may specify the node with the overall highest ejection rate over a sequence of measurement periods or other periods. The causation system determines that a job executing on a node that satisfies the congestion cause criterion is the cause of the network congestion. The execution threads of such a job may be executing on multiple nodes and sending many requests to a single node that is also executing an execution thread of that job. In some embodiments, a supervisory controller, upon detecting network congestion, analyzes ejection rate information received from local controllers collected from the network interface controllers to determine whether the nodes satisfy the congestion cause criterion. The local controllers may send ejection rate information to the supervisory controller via an out-of-band network connection. A job may comprise a single computer program or multiple computer programs.

In some embodiments, the congestion detection system may attempt to identify the job causing congestion by selective abatement of nodes. Prior to starting any abatement, the congestion detection system may identify candidate jobs as likely causing the congestion. For example, jobs executing on nodes with the highest congestion may be the candidate jobs. The congestion detection system then sends to the local controllers of the nodes executing the candidate jobs instructions to limit packet injection. If congestion then abates, the congestion detection system may assume that one or more of the candidate jobs is actually causing the congestion. If congestion does not abate, then the congestion detection system may then instruct all the nodes to limit their rates of injection and use the causation system to identify the job causing congestion.

Figure 5:
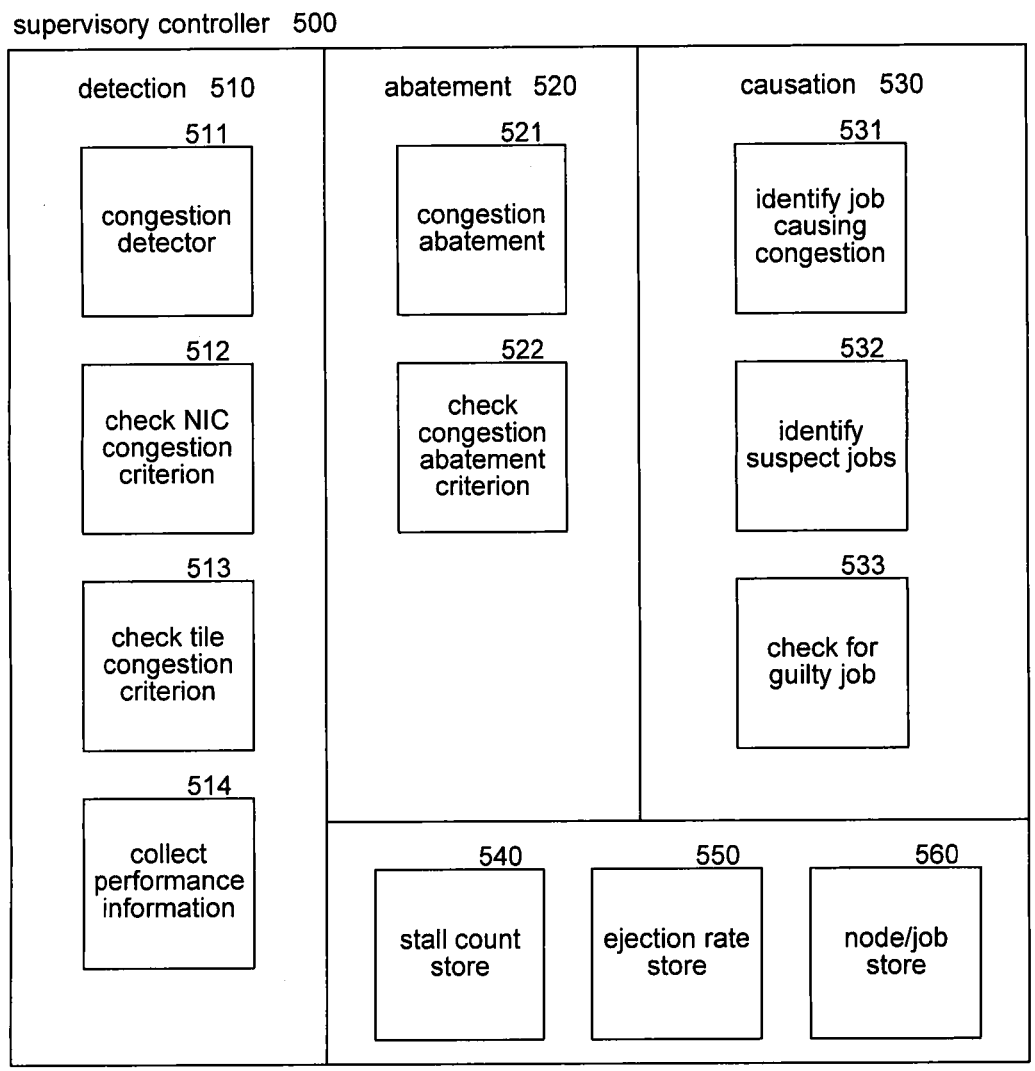
FIG. 5 is a block diagram that illustrates components of a supervisory controller of a congestion detection system in some embodiments.

FIG. 5 is a block diagram that illustrates components of a supervisory controller of a congestion detection system in some embodiments. The supervisory controller 500 includes a detection system 510, an abatement system 520, a causation system 530, a stall count store 540, an ejection rate store 550, and a node/job store 560. The detection system includes a congestion detector component 511, a check NIC congestion criterion component 512, a check tile congestion criterion component 513, and a collect performance information component 514. The congestion detector component may be executed every measurement period or other period or on an ad hoc basis based on another event (e.g., a signal from a local controller) to determine whether the network is congested based on the number of network components that are stalled as reported by the local controllers. The check NIC congestion criterion component determines whether the network is congested based on the number of stalled network interface controllers. The check tile congestion criterion component determines whether the network is congested based on the number of stalled tiles. The collect performance information component collects stall and ejection rate information from the local controllers and stores the information in the stall count store and ejection rate store. The stall count store may include an entry for each local controller for each measurement period that indicates the number of network components (e.g., a count of tiles and a separate count of network interface controllers) that were stalled during that period as indicated by the local controllers. The ejection rate store may contain entries for each node indicating the ejection rate of that node during each performance period during abatement.

The abatement system includes a congestion abatement component 521 and a check congestion abatement criterion component 522. The congestion abatement component may be executed every measurement period to determine whether the rate at which packets are injected into the network should be limited or on an ad hoc basis when congestion is detected. The congestion abatement component invokes the check congestion abatement criterion component to determine whether congestion should be abated. If congestion should be abated, the congestion abatement component notifies the local controllers and may indicate the degree to which each local controller is to limit the rate of packet injection into the network. This degree may be expressed in various forms, such as a fraction of a period (i.e., "pulse width") during which each local controller will allow packets to be injected into the network or as a percentage of the maximum injection rate. The abatement system may limit the injection rate only of compute nodes and not service nodes so that the service nodes can still provide services (albeit possibly slower because of the congestion) to the jobs executing at the compute nodes.

The causation system includes an identify job causing congestion component 531, an identify suspect jobs component 532, and a check for guilty job component 533. The identify job causing congestion component may be invoked periodically during abatement of all nodes (including service nodes) or on an ad hoc basis during abatement of all nodes. The identify job causing congestion component invokes the identify suspect jobs component to identify jobs executing on nodes whose ejection rate satisfies an ejection rate threshold for a measurement period (e.g., jobs that are misbehaving or have a design flaw). In some embodiments, the component may only monitor the ejection rates of compute nodes because jobs or programs of the service nodes may be assumed to behave. The ejection rate information may be collected and stored in the ejection rate store. The node/job store contains a mapping of each node to the jobs executing on that node. The check for guilty job component determines whether any of the suspected jobs satisfies the congestion cause criterion and indicates those jobs that are the likely cause of the network congestion. The causation system may in certain circumstances incorrectly identify a job as the cause of congestion. For example, during abatement, a job may have the highest ejection rate at a node but the job may be executing on nodes very close to that node resulting in very little impact on overall network congestion. In contrast, another job may be flooding the network with packets sent to many different nodes but none with a high ejection rate.

In some embodiments, the causation system may use a highest stall ratio algorithm to identify a job that is causing congestion. This algorithm is based on a principle that the network components of a node executing a job with a high injection rate are likely stalled more frequently. The stall ratio is the ratio of the number of flits whose injection to the network was stalled and the number of flits injected into the network. A local controller may collect these numbers prior to abatement. When abatement starts, each local controller analyzes its counters to identify a period in which the stall ratio was above a threshold stall ratio and reports it to the supervisory controller. The supervisory controller then identifies a job whose nodes have a high stall ratio as candidate job for causing congestion. The supervisory controller may use stall ratio as part of the criterion for identifying candidate jobs.

Figure 6:
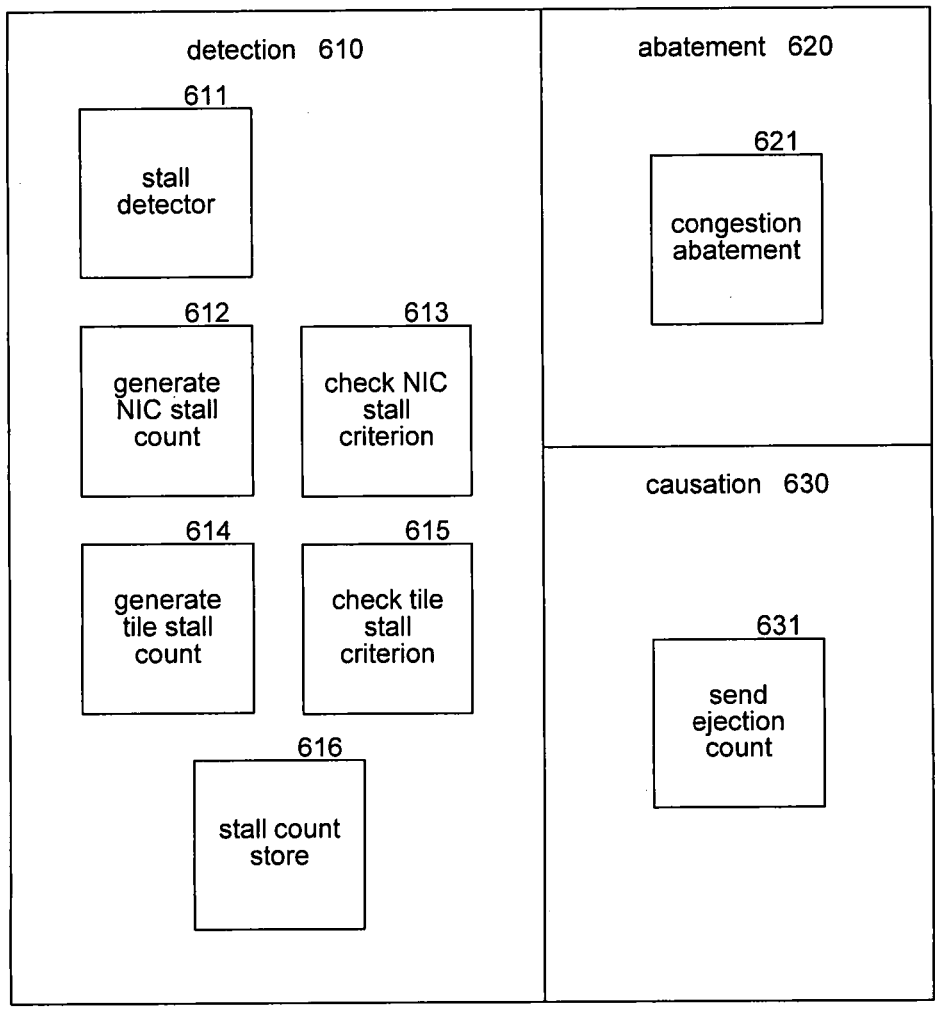
FIG. 6 is a block diagram that illustrates components of a local controller of a congestion detection system in some embodiments.

FIG. 6 is a block diagram that illustrates components of a local controller of a congestion detection system in some embodiments. The local controller 600 includes a detection component 610, an abatement component 620, and a causation component 630. The detection component includes a stall detector component 611, a generate NIC stall count component 612, a check NIC stall criterion component 613, a generate tile stall count component 614, a check tile stall criterion component 615, and a stall count store 616. The stall detector component invokes the generate NIC stall count component and the generate tile stall count component to generate the count of the stalled network components for a measurement period. Each stall count component invokes the corresponding check stall criterion component to determine whether the corresponding network component satisfies the corresponding stall criteria. The stall detector component may store the stall count information in the stall count store. The stall detector component sends the stall count information to the supervisory controller. The abatement component includes a congestion abatement component 621 that controls the limiting of the injection rate of packets into the network as instructed by the supervisory controller. The causation component includes a send ejection count component 631 that collects packet ejection information and sends the information to the supervisory controller.

The devices on which the congestion detection system may be implemented may include a central processing unit and memory and may include, particularly in the case of the system management workstation, input devices (e.g., keyboard and pointing devices), output devices (e.g., display devices), and storage devices (e.g., disk drives). Computer-readable media includes computer-readable storage media and data transmission media. The computer-readable storage media includes memory and other storage devices that may have recorded upon or may be encoded with computer-executable instructions or logic that implement the congestion detection system. The data transmission media is media for transmitting data using signals or carrier waves (e.g., electromagnetism) via a wire or wireless connection. Various functions of the congestion detection system may also be implemented on devices using discrete logic or logic embedded as an application-specific integrated circuit. The devices on which the congestion detection system is implemented computing devices.

The congestion detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
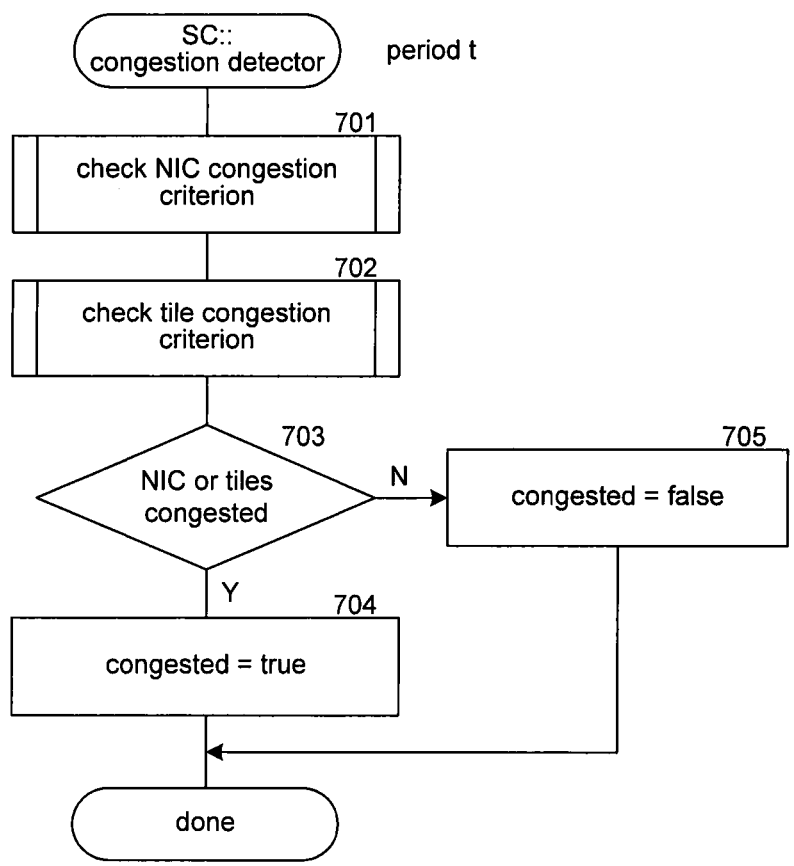
FIG. 7 is a flow diagram that illustrates the processing of a congestion detector component of a supervisory controller in some embodiments.

FIG. 7 is a flow diagram that illustrates the processing of a congestion detector component of a supervisory controller in some embodiments. The component may be passed an indication of the current measurement period and determines whether the network is congested based on information received from the local controllers. In block 701, the component invokes the check NIC congestion criterion component. In block 702, the component invokes the check tile congestion criterion component. In decision block 703, if the network interface controllers or the tiles satisfy the congestion criterion, then the component indicates that the network is congested in block 704, else the component indicates that the network is not congested in block 705. The component then completes. The component may alternatively determine whether the network is congested based on a combination of information derived from both the network interface controllers and the tiles or from just the network interface controllers or the tiles. For example, the component may detect congestion when both the stall count of the network interface controllers is above a certain threshold and the stall count of the tiles is above another threshold.

Figure 8:
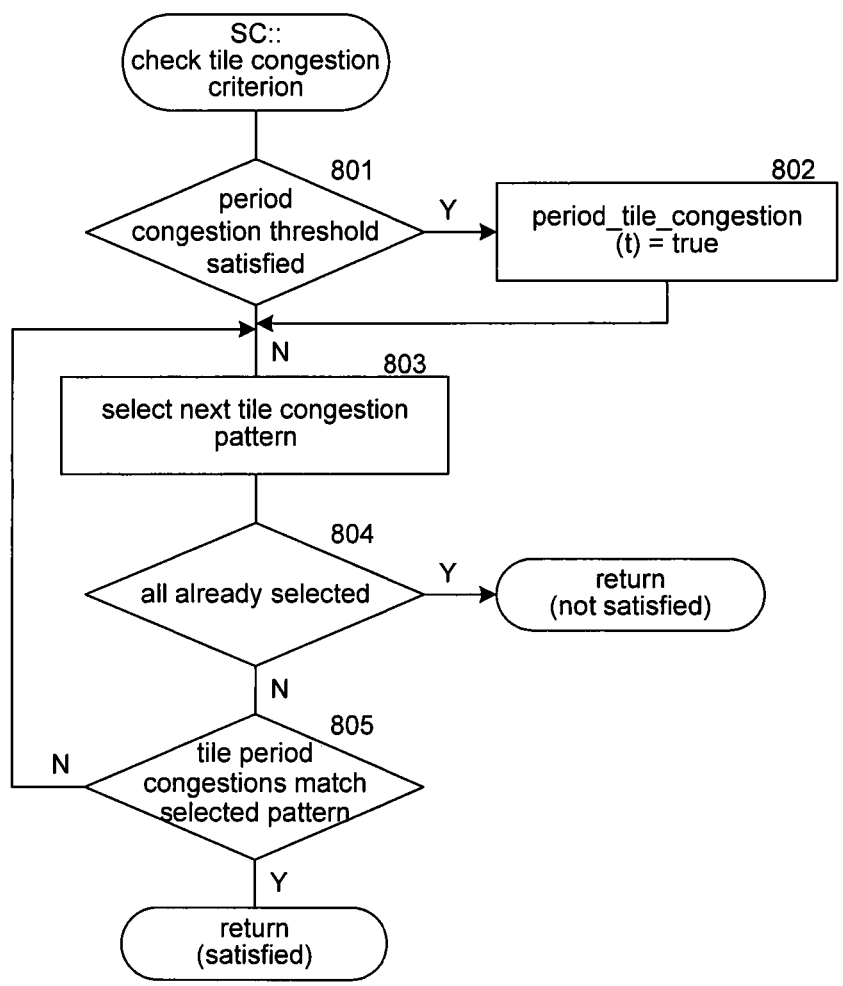
FIG. 8 is a flow diagram that illustrates the processing of a check tile congestion criterion component of a supervisory controller in some embodiments.

FIG. 8 is a flow diagram that illustrates the processing of a check tile congestion criterion component of a supervisory controller in some embodiments. In some embodiments, the component determines that the network is congested when the number of stalled tiles is greater than an upper threshold and determines that the network is no longer congested when the number of stalled tiles is less than a lower threshold. The component may make this determination whenever a count of stalled tiles is received. The use of an upper and lower threshold provides a hysteresis effect to help prevent the component from toggling too rapidly between determinations of congestion and determinations of no congestion. In this example embodiment, the component determines whether the tile stall information for the current measurement period indicates that the network appears to be congested. The component then determines whether the network is actually congested based on analysis of the congestion pattern over multiple measurement periods. In decision block 801, the component determines whether the tile stall counts for the current measurement period satisfy a congestion threshold. For example, the threshold may be a certain percentage of the number of tiles of the network. If the congestion threshold is satisfied, then the component indicates that the tiles are congested for the current measurement period in block 802. In blocks 803-805, the component loops determining whether the pattern of tile congestion over multiple measurement periods satisfies a tile congestion pattern. For example, a tile congestion pattern may indicate that the tiles are congested when congestion is detected in any three consecutive measurement periods out of the last five measurement periods. Thus, the network may be considered to be congested when tile congestion was detected for measurement periods t-2, t-3, and t-4 (where t represents the current measurement period), even though the tile congestion was not detected in measurement periods t and t-1 (that is, a pattern of "11100"). Such a tile congestion pattern allows network congestion to be indicated even though the tile congestion was not detected in the last two measurement periods. However, if tile congestion was not detected in the last three measurements periods, then the component would not indicate network congestion. Such a pattern prevents the component from alternating between network congestion and no network congestion when the tile stall count fluctuates slightly above and slightly below the threshold for congestion. Although network congestion is by patterns, the component may be implemented using any logic developed to determine whether a congestion criterion is satisfied to meet the needs of the particular network interconnect, nodes, jobs, etc. In block 803, the component selects the next tile congestion pattern. In decision block 804, if all the tile congestion patterns have already been selected, then the component returns an indication that the criterion is not satisfied, else the component continues at block 805. In decision block 805, if the period of tile congestion matches the selected pattern, then the component returns an indication that the criterion is satisfied, else the component loops to block 803 to select the next pattern. Although not illustrated in a figure, the check NIC congestion criterion component may operate in a manner similar to the check tile congestion criterion component.

Figure 9:
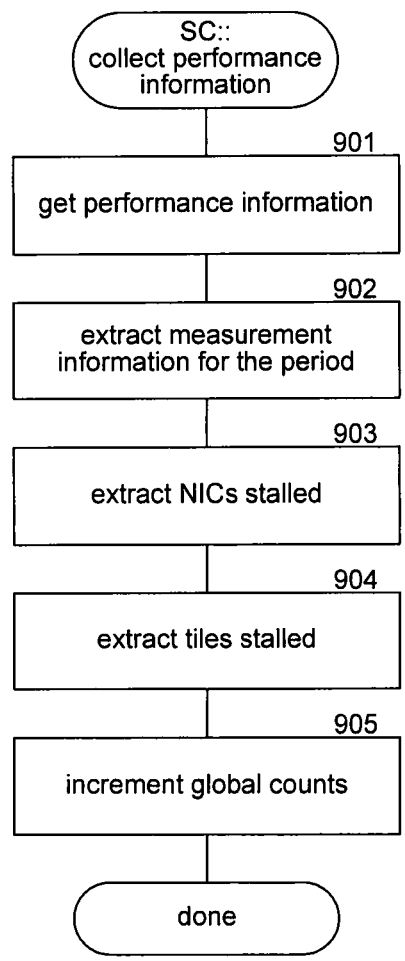
FIG. 9 is a flow diagram that illustrates the processing of a collect performance information component of a supervisory controller in some embodiments.

FIG. 9 is a flow diagram that illustrates the processing of a collect performance information component of a supervisory controller in some embodiments. The component collects performance information, such as stall counts and ejection rate, from the local controllers and stores the information in a data store. The component may be invoked whenever information is received from a local controller. In block 901, the component retrieves performance information. In block 902, the component extracts the measurement information. In blocks 903-904, the component extracts information indicating the number of the network interface controllers and tiles that were stalled during the measurement period. In block 905, the component increments the global count of network interface controllers and tiles that were stalled during the measurement period. In some embodiments, the local controllers may not send performance information (e.g., stall counts) for a measurement period in which the performance information is the same as (or very similar) to that of the previous measurement period. As a result, local controllers only send performance measurements when performance is changing and need not send performance information when the overall system is in a steady state. The component then completes.

Figure 10:
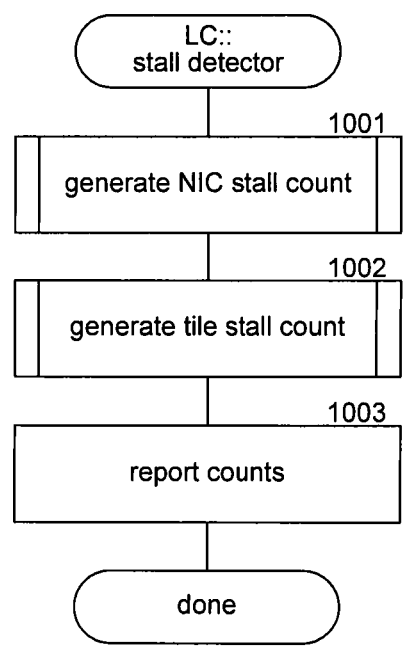
FIG. 10 is a flow diagram that illustrates the processing of a stall detector component of a local controller in some embodiments.

FIG. 10 is a flow diagram that illustrates the processing of a stall detector component of a local controller in some embodiments. The component may be invoked every measurement period to determine the number of network interface controllers and the number of tiles that are stalled. In block 1001, the component invokes the generate NIC stall count component. In block 1002, the component invokes the generate tile stall count component. In block 1003, the component reports any change in the counts to the supervisory controller and completes.

Figure 11:
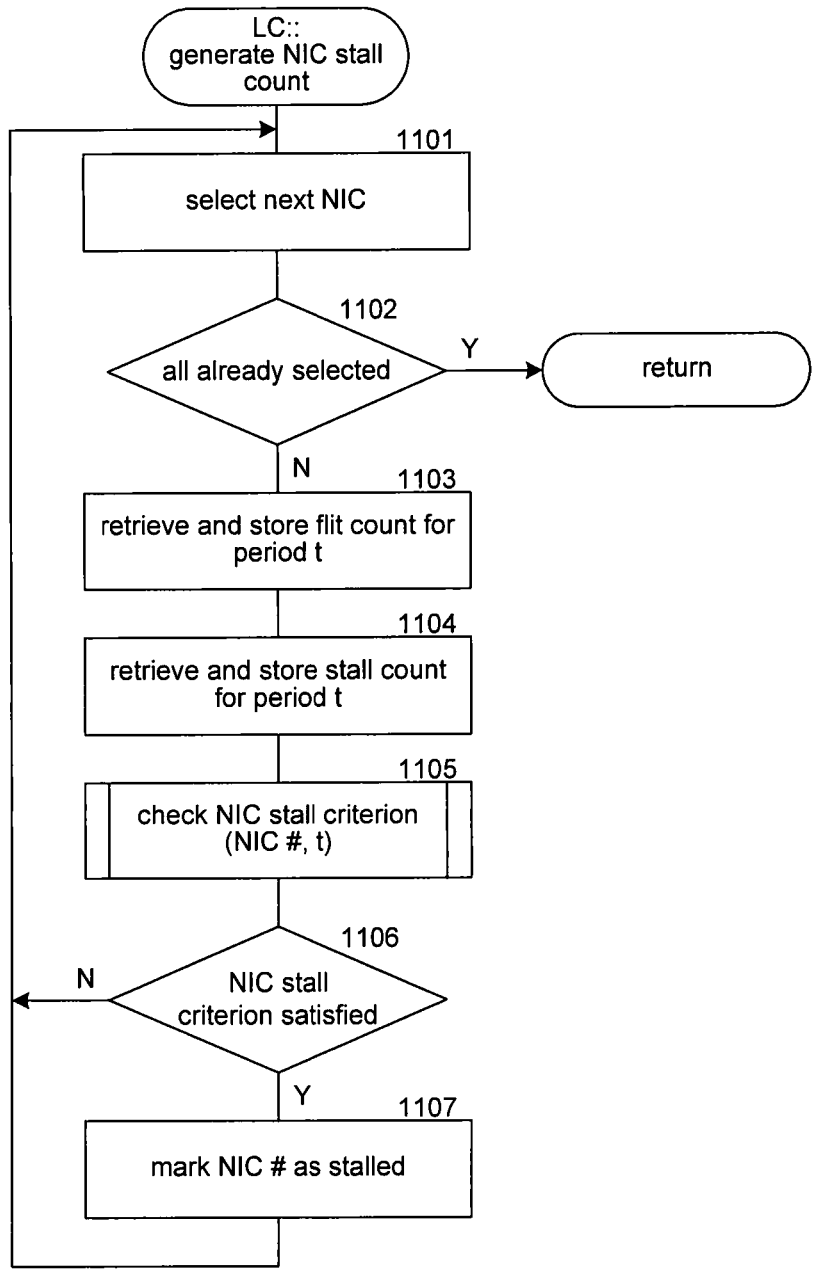
FIG. 11 is a flow diagram that illustrates the processing of a generate NIC stall count component of a local controller in some embodiments.
Figure 12:
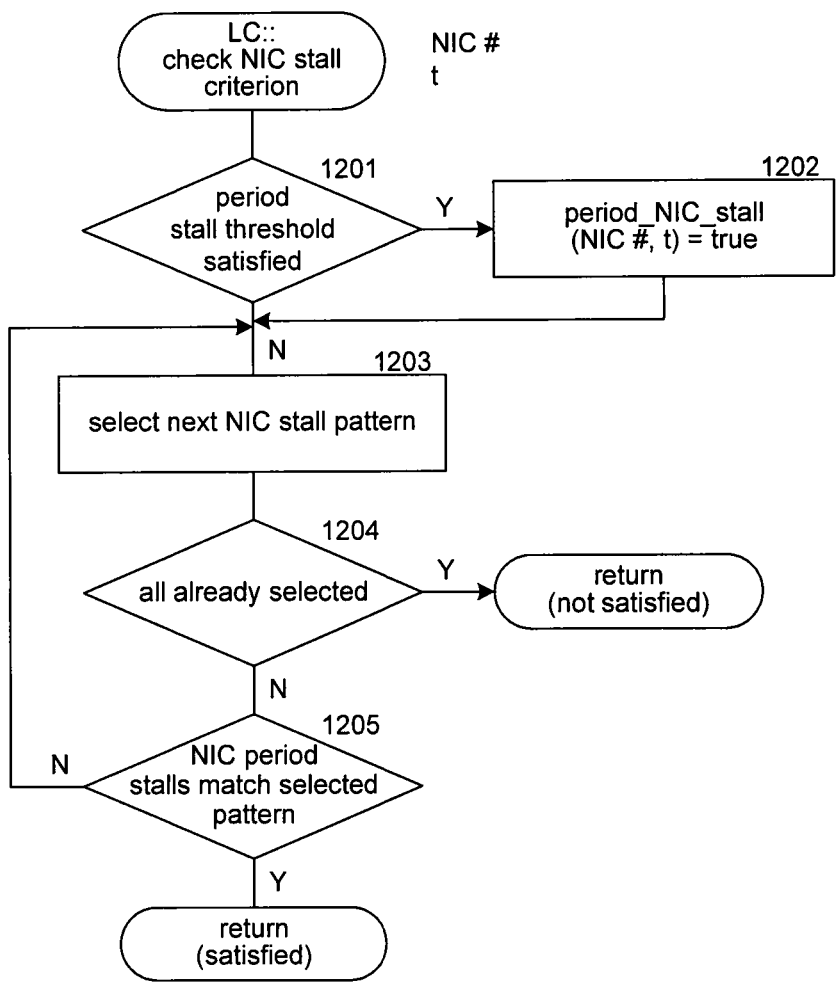
FIG. 12 is a flow diagram that illustrates the processing of a check NIC stall criterion component of a local controller in some embodiments.

FIGS. 11 and 12 illustrate processing for NIC stall counts. Although not illustrated in the figures, the processing for tile stall counts is similar to the processing for the NIC stall counts. In some embodiments, a local controller may collect stall counts on a more granular basis than a per-tile basis. For example, each tile may support virtual channels, and the stall counts may be on a per-virtual channel basis. FIG. 11 is a flow diagram that illustrates the processing of a generate NIC stall count component of a local controller in some embodiments. The component loops through each network interface controller that is controlled by this local controller and determines whether the network interface controller is stalled. In block 1101, the component selects the next network interface controller. In decision block 1102, if all the network interface controllers have already been selected, then the component returns, else the component continues at block 1103. In block 1103, the component retrieves and stores the count of the number of flits processed (e.g., injected into the network) by the selected network interface controller during the measurement period. In block 1104, the component retrieves and stores the count of the cycles during which a flit was delayed (i.e., stalled) during the measurement period. In block 1105, the component invokes the check NIC stall criterion component to determine whether the selected network interface controller is stalled. In decision block 1106, if the selected network interface controller satisfies the stall criterion, then the component marks the selected network interface controller as stalled in block 1107. The component then loops to block 1101 to select the next network interface controller.

FIG. 12 is a flow diagram that illustrates the processing of a check NIC stall criterion component of a local controller in some embodiments. The component is passed an indication of a network interface controller and a measurement period. In decision block 1201, if a stall threshold is satisfied for the network interface controller, then the component marks the network interface controller as being stalled for that measurement period in block 1202. In blocks 1203-1205, the component loops determining whether the pattern of stalls for the network interface controller matches a stall pattern. In block 1203, the component selects the next stall pattern. In decision block 1204, if all the stall patterns have already been selected, then the component returns an indication that the criterion is not satisfied, else the component continues at block 1205. In decision block 1205, if the next stall pattern matches the selected pattern, then the component returns an indication that the criterion is satisfied, else the component loops to block 1203 to select the next stall pattern.

Figure 13:
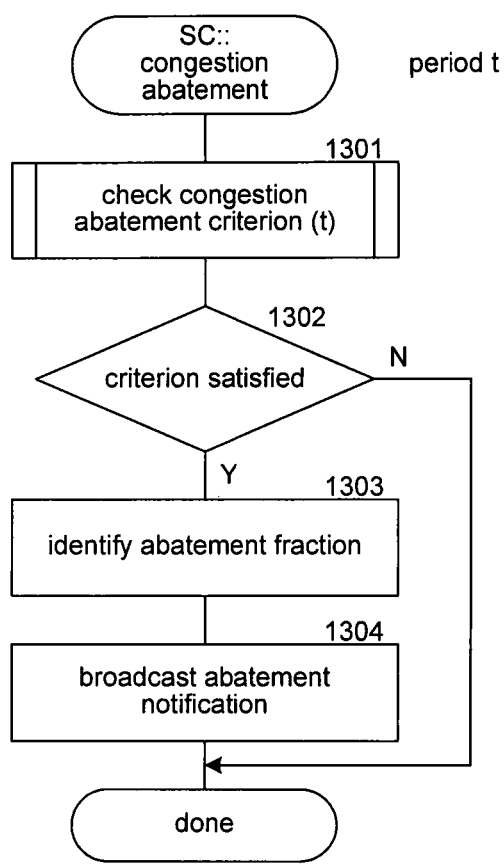
FIG. 13 is a flow diagram that illustrates the processing of a congestion abatement component of a supervisory controller in some embodiments.

FIG. 13 is a flow diagram that illustrates the processing of a congestion abatement component of a supervisory controller in some embodiments. The component may be invoked every measurement period to determine whether to start or continue abatement of network congestion. In block 1301, the component invokes the check congestion abatement criterion component. In decision block 1302, if the criterion is satisfied, then the component continues at block 1303, else the component completes. In block 1303, the component identifies the abatement amount such as the fraction for the pulse width modulation or the maximum rate of the injection of packets into the network. The component may determine the abatement amount based on the amount of network congestion, may use a fixed fraction, a fixed maximum injection rate, or so on. In block 1304, the component broadcasts an abatement notification to the local controllers and then completes. Alternatively, the component may broadcast only one start abatement notification when a start criterion is initially satisfied and a stop abatement notification when a start criterion is satisfied, rather than sending periodic abatement notifications.

Figure 14:
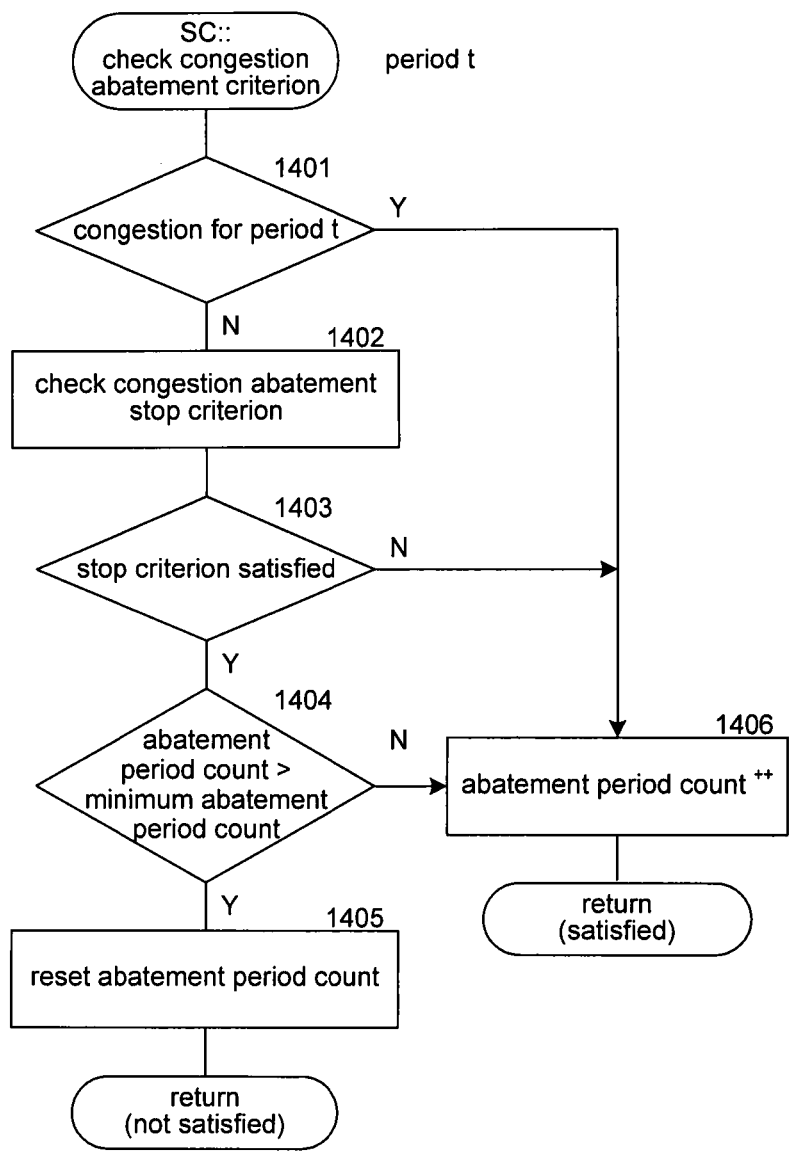
FIG. 14 is a flow diagram that illustrates the processing of a check congestion abatement criterion of a supervisory controller in some embodiments.

FIG. 14 is a flow diagram that illustrates the processing of a check congestion abatement criterion of a supervisory controller in some embodiments. The component is passed an indication of the measurement period and determines whether to start or continue abatement of network congestion. Once abatement is started, the component may ensure that abatement continues for a minimum number of periods. The component may also use a different criterion for stopping abatement than used for starting abatement. In particular, the criterion used for stopping abatement may be based on significantly less network congestion than is required for starting the abatement. The use of different criteria produces a hysteresis effect to ensure that the abatement system does not toggle rapidly between starting abatement and stopping abatement. In decision block 1401, if the network is congested for the current measurement period, then the component continues at block 1406, else the component continues at block 1402. In block 1402, the component checks the abatement stop criterion. In decision block 1403, if the abatement stop criterion is satisfied, then the component continues at block 1404, else the component continues at block 1406. In decision block 1404, if the number of periods since abatement was started exceeds the minimum number of periods for abatement, then the component continues at block 1405, else the component continues at block 1406. In block 1405, the component resets the abatement period count and returns an indication that the criterion is not satisfied. In block 1406, the component starts or continues with the abatement, increments the abatement period count, and returns an indication that the criterion is satisfied.

Figure 15:
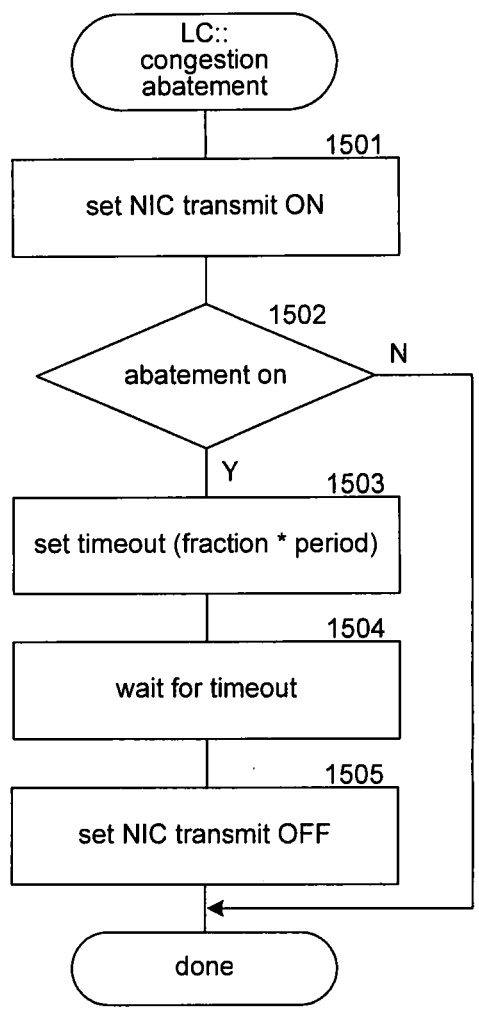
FIG. 15 is a flow diagram that illustrates the processing of a congestion abatement component of a local controller in some embodiments.

FIG. 15 is a flow diagram that illustrates the processing of a congestion abatement component of a local controller in some embodiments. The component may be invoked every period. The abatement periods may be the same as or different from the measurement periods. In block 1501, the component sets a flag to indicate that the network interface controller is allowed to inject packets into the network. In decision block 1502, if abatement of network congestion is currently on, then the component continues at block 1503, else the component completes. In block 1503, the component sets a timeout corresponding to the width for the pulse width modulation. In block 1504, the component waits for the timeout. In block 1505, the component sets a network interface controller to stop injecting packets into the network and then completes. The component is then invoked during the next period. The result of invoking the component during each period is that when abatement is on, the flag indicates that injection is allowed throughout each period and when abatement is off, the flag indicates that injection is allowed only during the fraction of the period starting with invocation of the component and the flag indicates that injection is not allowed during the remainder of the period.

Figure 16:
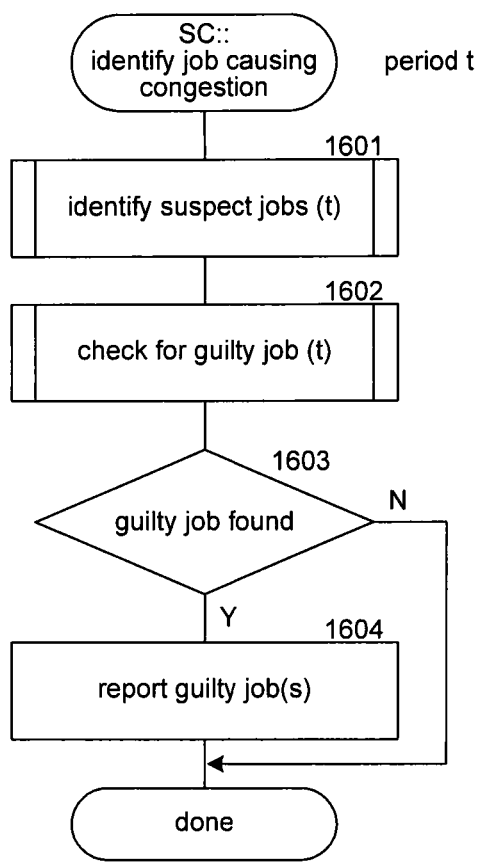
FIG. 16 is a flow diagram that illustrates the processing of an identify job causing congestion component of a supervisory controller in some embodiments.

FIG. 16 is a flow diagram that illustrates the processing of an identify job causing congestion component of a supervisory controller in some embodiments. The component may be invoked every period, less frequently, or on an ad hoc basis. The component identifies a job that is causing the network congestion based on the ejection rate of packets or flits from a network interface controller to a node executing a portion of that job. In block 1601, the component invokes an identify suspect jobs component to identify jobs that are suspected of causing the congestion. In block 1602, the component invokes a check for guilty job component to identify which of the suspect jobs is guilty of causing the network congestion. In decision block 1603, if the guilty job is found, then the component reports an indication of the guilty job or jobs in block 1604. The component then completes.

Figure 17:
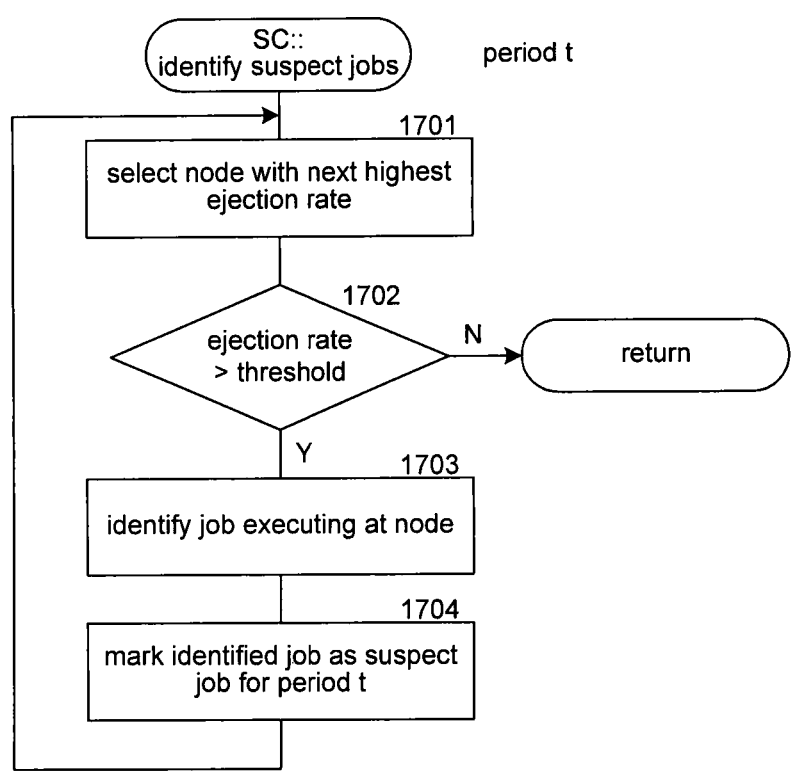
FIG. 17 is a flow diagram that illustrates the processing of an identify suspect jobs component of a supervisory controller in some embodiments.

FIG. 17 is a flow diagram that illustrates the processing of an identify suspect jobs component of a supervisory controller in some embodiments. The component identifies those jobs whose ejection rate for the current period exceeds a threshold. In block 1701, the component selects the node with the next highest ejection rate starting with the highest ejection rate. In decision block 1702, if the ejection rate is greater than a threshold ejection rate, then the component continues at block 1703, else the component returns. In block 1703, the component identifies the jobs executing at the selected node. In block 1704, the component marks the identified jobs as being suspected of causing the congestion for the current period. The component then loops to block 1701 to select the next node.

Figure 18:
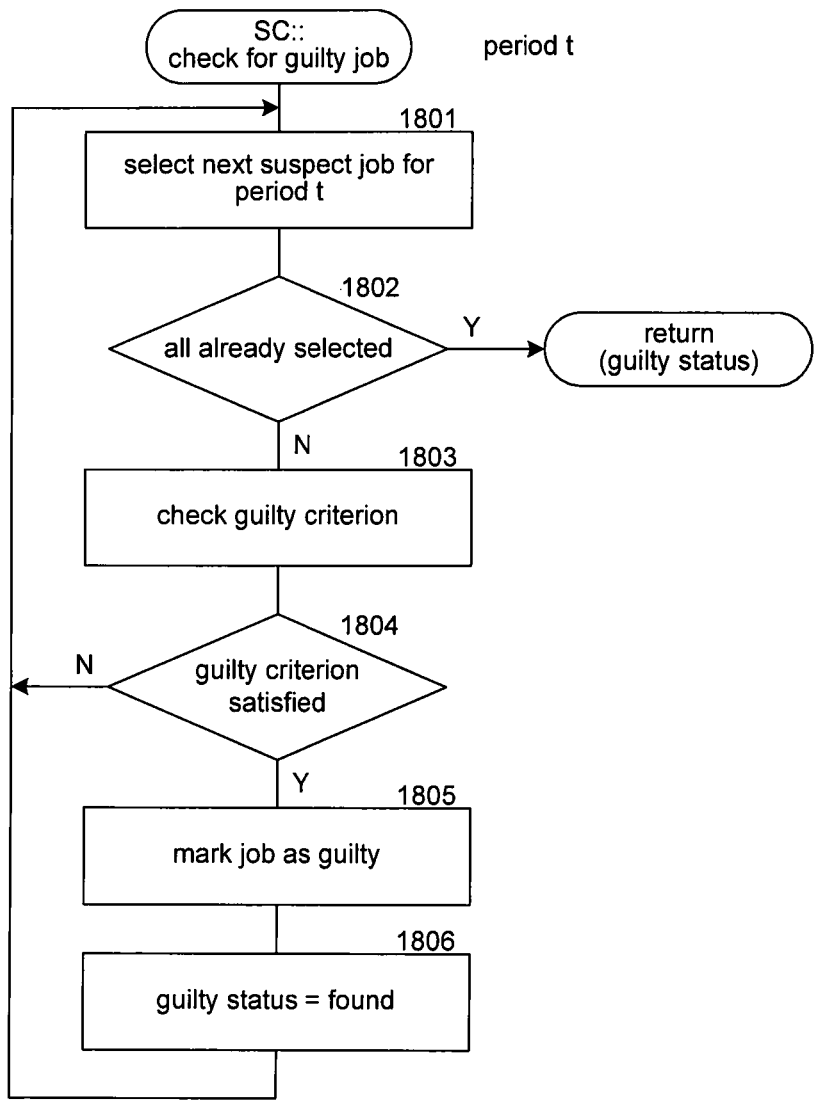
FIG. 18 is a flow diagram that illustrates the processing of a check for guilty job component of a supervisory controller in some embodiments.

FIG. 18 is a flow diagram that illustrates the processing of a check for guilty job component of a supervisory controller in some embodiments. The component determines whether suspect jobs for the current period match a guilty criterion. For example, the guilty criterion may be that the suspect job has the highest ejection rate over the last five consecutive periods or the last few times that abatement was started. The guilty criterion may also be based on other factors such as number of nodes on which a job is executing, not being on a list of jobs that are unlikely to cause congestion, and so on. In block 1801, the component selects the next suspect job for the current period. In decision block 1802, if all the suspect jobs have already been selected, then the component returns an indication of whether a guilty job has been identified. In block 1803, the component checks the guilty criterion for the selected suspect job. In decision block 1804, if the guilty criterion is satisfied, then the component continues at block 1805, else the component loops to block 1801 to select the next suspect job. In block 1805, the component marks the selected job as being guilty. In block 1806, the component sets the guilty status to found and loops to block 1801 to select the next suspect job.

Figure 19:
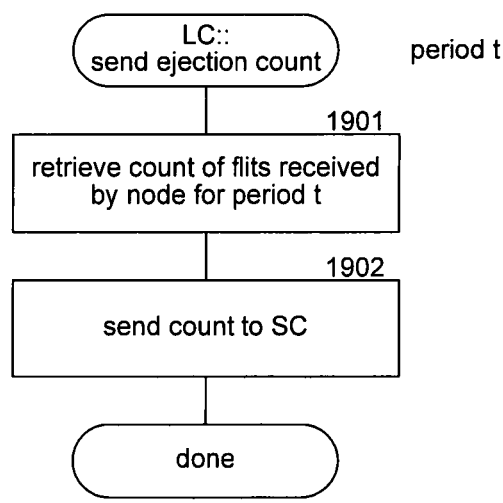
FIG. 19 is a flow diagram that illustrates the processing of a send ejection count component of a local controller in some embodiments.

FIG. 19 is a flow diagram that illustrates the processing of a send ejection count component of a local controller in some embodiments. The component may be invoked every measurement period or other period (e.g., during congestion). In block 1901, the component retrieves the count of flits received by each node connected to the local controller for the current period. In block 1902, the component sends the counts to the supervisory controller and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. In some embodiments, various parameters of the detection system such as thresholds, criteria, patterns, lengths of periods, and so on can be determined empirically based on analysis of the characteristics of the network interconnect including architecture, speed of components, clock rates, and so on. The parameters may be different for the different types of network components (e.g., tiles or network interface controllers). The supervisory controller may provide a user interface through which an administrator may tailor the detection system by defining functions for use in evaluating such parameters. Such functions may be distributed to the various controllers that implement the detection system. In some embodiments, the various controllers may perform simple data collection and forwarding without analysis of the collected data to the supervisory controller for analysis. In some embodiments, the congestion detection system may collect performance measurements at the router level, rather than for components of a router. The congestion detection system may detect congestion at various connection devices for sending data through a network and between networks. The connection devices may include routers, switches, network switches, switching hubs, switching devices, routing devices, network routers, packet switches, connectors, sub-components of such connection devices, and so on. The components of a network may be connected via wired or wireless connections. Although the data routed through the network is described as being organized as packets with flits, the data may be organized in other ways (e.g., packets without any subdivision into flits, packets with a fixed number of sub-packets or flits, or fixed-sized packets). Accordingly, the invention is not limited except as by the appended claims.

We claim:

1. A method for abating network congestion in a network of nodes connected via a network interconnect, each node connected to a local controller, each of a plurality of the local controllers connected to a supervisory controller via an independent network connection that is independent of the network interconnect, the method comprising:
   determining at the supervisory controller whether the network is congested based on information received from the local controllers via the independent network connection;
   upon determining that the network is congested, sending from the supervisory controller to each local controller via the independent network connection an indication that the network is congested; and
   upon receiving at a local controller an indication that the network is congested, limiting a rate at which packets are injected into the network by nodes controlled by the local controller
   wherein each node is connected to the network via a network interface controller and the limiting of the rate of injection of packets includes the local controller signaling the network interface controller of a device to effect the limiting of the rate of injection of packets,
   wherein the local controller signals the network interface controller to allow a limited number of outstanding requests, and
   wherein the limited number of outstanding requests is one.

2. The method of claim 1 wherein the determining of whether the network is congested includes determining whether the received information satisfies a start abatement criterion.

3. The method of claim 2 including determining at the supervisory controller whether to stop the limiting of the rate of injection of packets based on whether the information received from the local controllers satisfies a stop abatement criterion.

4. A method for abating network congestion in a network of nodes connected via a network interconnect, each node connected to a local controller, each of a plurality of the local controllers connected to a supervisory controller via an independent network connection that is independent of the network interconnect, the method comprising:
   determining at the supervisory controller whether the network is congested based on information received from the local controllers via the independent network connection by determining whether the received information satisfies a start abatement criterion;
   upon determining that the network is congested, sending from the supervisory controller to each local controller via the independent network connection an indication that the network is congested;
   upon receiving at a local controller an indication that the network is congested, limiting a rate at which packets are injected into the network by nodes controlled by the local controller; and
   determining at the supervisory controller whether to stop the limiting of the rate of injection of packets based on whether the information received from the local controllers satisfies a stop abatement criterion wherein the stop abatement criterion specifies less network congestion than the start abatement criterion to implement a hysteresis effect on abatement.

5. The method of claim 4 wherein the local controller signals the network interface controller to wait a minimum time period between injection of packets.

6. The method of claim 4 wherein the limiting of the rate of injection of packets continues for a minimum length of time.

7. The method of claim 4 wherein the supervisory controller and the local controllers form a hierarchy of controllers that are connected via independent network connections and not connected via the network interconnect.

8. A computer-readable medium that is not a transitory, propagating signal, the computer-readable medium containing computer-executable instructions for abating network congestion in a network of nodes, each node connected to a local controller and connected to the network via a network interface controller, each of a plurality of the local controllers connected to a supervisory controller, the computer-executable instructions comprising instructions that:
   determine at the supervisory controller whether the network is congested based on information received from the local controllers; and
   upon determining that the network is congested, send from the supervisory controller to local controllers via a supervisory communication network that is out of band from the network an indication that the local controller is to limit the rate at which data is injected into the network by nodes controlled by the local controllers
   wherein the limiting of the rate of injection of data includes the local controller signaling the network interface controller to allow a limited number of outstanding requests, and
   wherein the limited number of outstanding requests is one.

9. The computer-readable medium of claim 8 wherein the instructions that determine whether the network is congested determine whether the received information satisfies a start abatement criterion.

10. The computer-readable medium of claim 9 further including instructions that determine at the supervisory controller whether to stop the limiting of the rate of injection of data based on whether the information received from the local controllers satisfies a stop abatement criterion.

11. A computer-readable medium that is not a transitory, propagating signal, the computer-readable medium containing computer-executable instructions for abating network congestion in a network of nodes, each node connected to a local controller and connected to the network via a network interface controller, each of a plurality of the local controllers connected to a supervisory controller, the computer-executable instructions comprising instructions that:
   determine at the supervisory controller whether the network is congested based on information received from the local controllers by determining whether the received information satisfies a start abatement criterion;
   upon determining that the network is congested, send from the supervisory controller to local controllers via a supervisory communication network that is out of band from the network an indication that the local controller is to limit the rate at which data is injected into the network by nodes controlled by the local controllers wherein the limiting of the rate of injection of data includes the local controller signaling the network interface controller to limit the rate of injection of data; and
   determine at the supervisory controller whether to stop the limiting of the rate of injection of data based on whether the information received from the local controllers satisfies a stop abatement criterion wherein the stop abatement criterion specifies less network congestion than the start abatement criterion to implement a hysteresis effect on abatement.

12. The computer-readable medium of claim 11 wherein the information received from the local controller indicates whether a connection device is stalled.

13. The computer-readable medium of claim 11 further including instructions that identify at the supervisory controller a job executing at a node of the network that is causing the network congestion based on the ejection rate of data from the network at the node.

14. A computing device for controlling congestion in a network of nodes connected via connection devices forming a network interconnect, each connection device connected to a local controller device, each of a plurality of the local controller devices connected to a supervisory controller device via an independent network connection that is independent of the network interconnect, the computing device comprising:
- a memory storing computer-executable instructions implementing:
  - congestion detector logic that:
    - collects from the local controllers via the independent network connection performance information indicating performance of the network in sending packets; and
    - detects when the network is congested based on analysis of the performance information; and
  - a congestion abatement component that, upon detecting that the network is congested, directs the local controller devices via the independent network connection to limit the rate at which nodes inject data into the network wherein the local controller signals a node to allow a limited number of outstanding requests and wherein the limited number of outstanding requests is one; and
- a processor for executing the computer-executable instruction stored in the memory.

15. The computing device of claim 14 wherein the computer-executable instructions further implement a congestion causation logic that identifies a job that is a cause of the network congestion based on an ejection rate of data from the network to a node that is executing the job.

16. A computing device for controlling congestion in a network of nodes connected via connection devices forming a network interconnect, each connection device connected to a local controller device, each of a plurality of the local controller devices connected to a supervisory controller device via an independent network connection that is independent of the network interconnect, the computing device comprising:
- a memory storing computer-executable instructions implementing:
  - congestion detector logic that:
    - collects from the local controllers via the independent network connection performance information indicating performance of the network in sending packets; and
    - detects when the network is congested based on analysis of the performance information by determining whether the collected performance information satisfies a start abatement criterion; and
  - a congestion abatement component that, upon detecting that the network is congested, directs the local controller devices via the independent network connection to limit the rate at which nodes inject data into the network wherein the supervisory controller determined whether to stop the limiting of the rate of injection of data based on whether the information received from the local controllers satisfies a stop abatement criterion and wherein the stop abatement criterion specifies less network congestion than the start abatement criterion to implement a hysteresis effect on abatement.

\* \* \* \* \*